United States Patent
Bledsoe et al.

(10) Patent No.: US 7,773,796 B2
(45) Date of Patent: Aug. 10, 2010

(54) SYSTEMS AND METHODS FOR DETERMINING POSITION AND VELOCITY OF A HANDHELD DEVICE

(75) Inventors: James D. Bledsoe, Corvallis, OR (US);
Gregory F. Carlson, Corvallis, OR (US); Asher Simmons, Corvallis, OR (US); James Mealy, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 3 days.

(21) Appl. No.: 12/200,717

(22) Filed: Aug. 28, 2008

(65) Prior Publication Data

US 2009/0060283 A1    Mar. 5, 2009

Related U.S. Application Data

(60) Provisional application No. 60/968,480, filed on Aug. 28, 2007.

(51) Int. Cl.
G06K 9/00    (2006.01)
(52) U.S. Cl. .................. 382/141; 382/113; 382/112; 382/238
(58) Field of Classification Search .......... 382/141, 382/113, 112, 238
See application file for complete search history.

(56) References Cited

U.S. PATENT DOCUMENTS

| | | | |
|---|---|---|---|
| 4,881,065 | A | 11/1989 | Soma et al. |
| 5,793,382 | A | 8/1998 | Yerazunis et al. |
| 5,815,140 | A | 9/1998 | Kitazawa |
| 6,218,659 | B1 | 4/2001 | Bidiville et al. |
| 6,249,360 | B1 | 6/2001 | Pollard et al. |
| 2004/0109034 | A1 | 6/2004 | Brouhon |
| 2006/0001657 | A1 | 1/2006 | Monney et al. |
| 2006/0256399 | A1* | 11/2006 | Murakami et al. .......... 358/468 |
| 2007/0159464 | A1 | 7/2007 | Seo et al. |

(Continued)

FOREIGN PATENT DOCUMENTS

EP    1 227 432 A1    7/2002

(Continued)

OTHER PUBLICATIONS

Is Mackenzie et al.: "A two-ball mouse affords three degrees of freedom" Conference on Human Factors in Computing Systems, CHI 97, [Online] Mar. 22-27, 1997, pp. 303-304, XP002501707, New York, US, Retrieved from the Internet: URL:http//delivery.acm.org/10.1145/113000key2=1188725221&col1=GUIDE&dl=GUIDE&CFID=8525844&CFTOKEN=35700169> [retrieved on Oct. 28, 2008].

*Primary Examiner*—Matthew C Bella
*Assistant Examiner*—Mike Rahmjoo

(57) ABSTRACT

Embodiments of the present invention provide a handheld device that comprises an information module for obtaining and/or receiving information pertaining to a surface adjacent to the device, and a position determination arrangement for determining at least one of a position and/or velocity of the handheld device. The position determination arrangement comprises a determination module configured to determine at least one of a relative position of the handheld device and/or a velocity of the handheld device based upon at least one of surface markings located on the surface adjacent the device and/or apparatus markings located on an input apparatus. The surface markings and the apparatus markings are configured to provide absolute position information.

21 Claims, 10 Drawing Sheets

U.S. PATENT DOCUMENTS

2008/0101700 A1* 5/2008 Onishi et al. ................. 382/181
2009/0040286 A1* 2/2009 Tan et al. .................... 347/109

FOREIGN PATENT DOCUMENTS

| | | | |
|---|---|---|---|
| EP | 1 617 319 | A2 | 1/2006 |
| GB | 2 272 763 | A1 | 5/1994 |
| WO | WO 97/15880 | A | 5/1997 |
| WO | WO 2004/088576 | A1 | 10/2004 |

* cited by examiner

Regions for
ArcTan Ratio

SYSTEMS AND METHODS FOR DETERMINING POSITION AND VELOCITY OF A HANDHELD DEVICE

CROSS REFERENCE TO RELATED APPLICATIONS

The present application claims priority to U.S. Patent Application No. 60/968,480, filed Aug. 28, 2007, entitled "True X-Y Position, Velocity and Angular Determination of Random Motion Devices Using the Integration of Roller Ball and Optical Navigation Technologies," the entire specification of which is hereby incorporated by reference in its entirety for all purposes, except for those sections, if any, that are inconsistent with this specification.

TECHNICAL FIELD

Embodiments of the present invention relate to the field of image translation and, more particularly, to determining positioning of a handheld image translation device.

BACKGROUND

Traditional printing devices rely on a mechanically operated carriage to transport a print head in a linear direction as other mechanics advance a medium in an orthogonal direction. As the print head moves over the medium an image may be laid down. Portable printers have been developed through technologies that reduce the size of the operating mechanics. However, the principles of providing relative movement between the print head and medium remain the same as traditional printing devices. Accordingly, these mechanics limit the reduction of size of the printer as well as the material that may be used as the medium.

Handheld printing devices have been developed that ostensibly allow an operator to manipulate a handheld device over a medium in order to print an image onto the medium. However, these devices are challenged by the unpredictable and nonlinear movement of the device by the operator. The variations of operator movement, including rotation of the device itself, make it difficult to determine the precise location of the print head. This type of positioning error may have deleterious effects of the quality of the printed image.

Certain handheld scanners have been developed for acquiring an image from a target media. During a scan, image data is recorded by image sensors along with positioning data by positioning sensors, which bracket the image sensors. The accumulated image data is position-tagged and recorded as distorted image data. Once the distorted image data has been acquired, it will be processed to provide a rectified image that corrects for rotational distortions. This rectification process further relies on overlapping regions of acquired image data to facilitate the stitching of the final image.

While this process may work in a scanning scenario, a printing scenario presents other challenges. For example, in a printing operation the positioning of a handheld printing device may not be postponed until after a medium has been fully scanned. Furthermore, stitching of a captured image may also not be available.

SUMMARY

In accordance with various embodiments, a handheld device comprises an information module for obtaining and/or receiving information pertaining to a surface adjacent to the device, and a position-determination arrangement for determining at least one of a position and/or velocity of the handheld device. The position-determination arrangement comprises a determination module configured to determine the position and/or velocity of the handheld device based upon at least one of surface markings located on the surface adjacent the device and/or apparatus markings located on an input apparatus, wherein the surface markings and apparatus markings are configured to provide absolute position information relative to the handheld device.

In accordance with various embodiments, the input apparatus comprises a roller ball supported within a frame and including the apparatus markings, at least three bearings to movably support the roller ball within the frame, and at least two sensors to read the apparatus markings. In accordance with various embodiments, the at least two sensors comprise a CMOS imaging sensor.

In accordance with various embodiments, the input apparatus further comprises at least one cleaning bracket adjacent to the roller ball. In accordance with some embodiments, the handheld device comprises at least two input apparatus. In accordance with some embodiments, the handheld device comprises at least four input apparatus.

In accordance with various embodiments, the apparatus markings comprise patterns painted on a surface of the roller ball. In accordance with some embodiments, the apparatus markings comprise patterns embedded in a surface of the roller ball.

In accordance with some embodiments, the determination module comprises at least two image sensors configured to read pre-printed patterns from an adjacent surface. In accordance with some embodiments, the at least two image sensors are infra-red CMOS sensors.

In accordance with various embodiments, the handheld device is a printer. In accordance with some embodiments, the handheld device is a scanner. In accordance with some embodiments, the handheld device is an image translation device configured to print and to scan.

In accordance with various embodiments, the determination module is further configured to determine a predictive position of the handheld device. In accordance with some embodiments, the determination module is configured to determine the predictive position of the handheld device using a two dimensional parametric curve function. In accordance with some embodiments, the two dimensional parametric curve function is a Catmull-Rom Bicubic Spline function.

The present invention also provides a method comprising moving a handheld device over a surface, reading markings on at least one of the surface and/or an input apparatus, wherein the markings are configured to provide absolute position information, and determining at least one of a position and/or and angle and/or a velocity of the handheld device based upon the reading of the markings.

In accordance with various embodiments, the method further comprises depositing a printing substance on the surface. In accordance with various embodiments, the method further comprises using an image representation to determine a level of deposition of the printing substance. In accordance with various embodiments, the method further comprises using an image representation that is modified as the printing substance is deposited. In accordance with some embodiments, the method further comprises scanning information from the surface. In accordance with various embodiments, the method further comprises removing distortion from a scanned image. In accordance with various embodiments, the method further comprises stitching scanned information to form a complete scanned image.

In accordance with various embodiments, the markings are read from a track ball included in the input apparatus. In accordance with various embodiments, further comprises cleaning the track ball as the handheld device is moved.

In accordance with various embodiments, the markings are read from the surface. In accordance with various embodiments, the markings are read from the surface and from a track ball included in the input apparatus.

In accordance with various embodiments, the method further comprises determining a predictive position of the handheld device. In accordance with some embodiments, the predictive position is determined using a two dimensional parametric curve function. In accordance with various embodiments, the two dimensional parametric curve function is a Catmull-Rom Bicubic Spline function.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
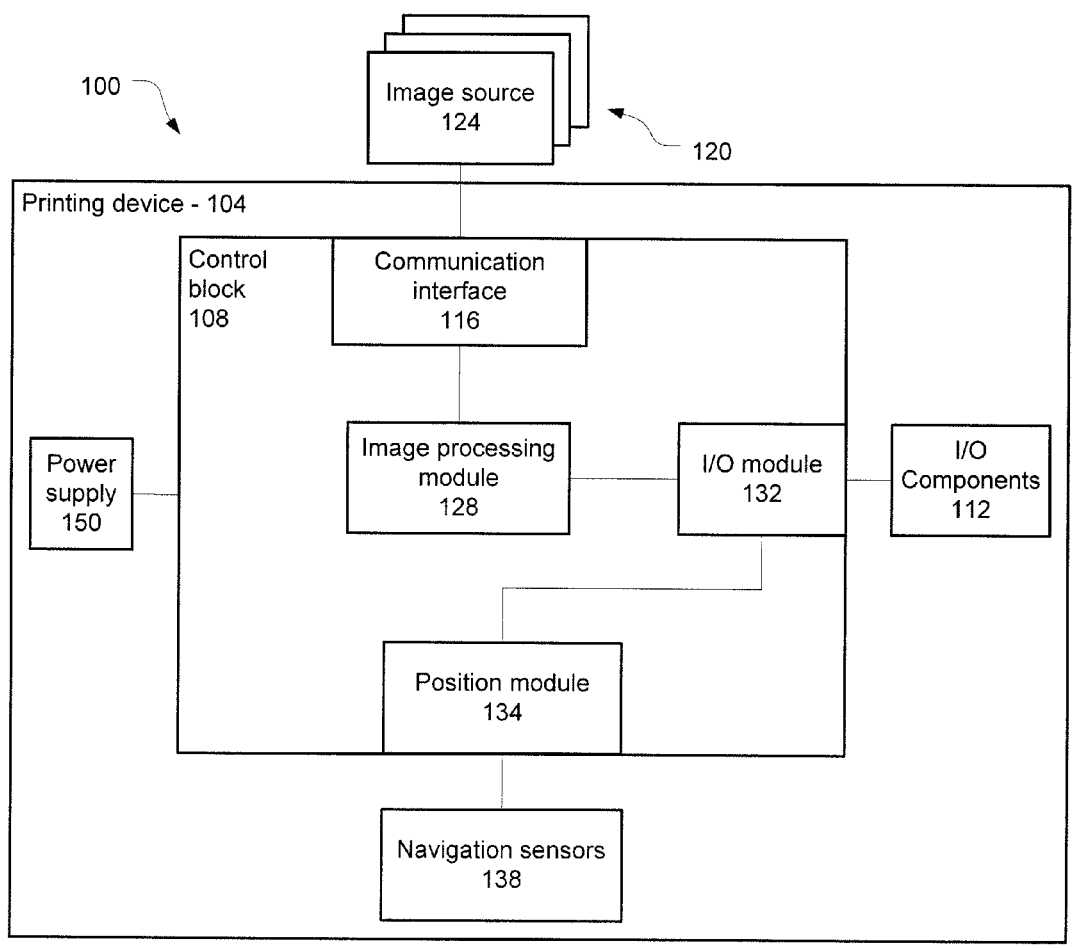
FIG. 1 is a schematic of a system including a handheld image translation device in accordance with various embodiments of the present invention.

FIG. 1 is a schematic of a system 100 including a handheld image translation (IT) device 104 in accordance with various embodiments of the present invention. The IT device 104 may include a control block 108 with components designed to facilitate precise and accurate positioning of input/output (I/O) components 112 throughout an entire IT operation. This positioning may allow the IT device 104 to reliably translate an image in a truly mobile and versatile platform as will be explained herein.

Image translation, as used herein, may refer to a translation of an image that exists in a particular context (e.g., medium) into an image in another context. For example, an IT operation may be a scan operation. In this situation, a target image, e.g., an image that exists on a tangible medium, is scanned by the IT device 104 and an acquired image that corresponds to the target image is created and stored in memory of the IT device 104. For another example, an IT operation may be a print operation. In this situation, an acquired image, e.g., an image as it exists in memory of the IT device 104, may be printed onto a medium.

The control block 108 may include a communication interface 116 configured to communicatively couple the control block 108 to an image transfer device 120. The image transfer device 120 may include any type of device capable of transmitting/receiving data related to an image, or image data, involved in an IT operation. The image transfer device 120 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 120 is a removable storage device, e.g., a universal serial bus (USB) storage device, the communication interface 116 may be coupled to a port, e.g., USB port, of the IT device 104 designed to receive the storage device.

The communication interface 116 may include a wireless transceiver to allow the communicative coupling with the image transfer device 120 to take place over a wireless link. The image data may be wirelessly transmitted over the link through the modulation of electromagnetic waves with frequencies in the radio, infrared or microwave spectrums.

A wireless link may contribute to the mobility and versatility of the IT device 104. However, some embodiments may additionally/alternatively include a wired link communicatively coupling the image transfer device 120 to the communication interface 116.

In some embodiments, the communication interface 116 may communicate with the image transfer device 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

When the IT operation includes a print operation, the communication interface 116 may receive image data from the image transfer device 120 and transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image transfer device 120 or another device. The processed image may then be transmitted to an I/O module 132, which may function as a print module in this embodiment, where it is cached in anticipation of the print operation.

The I/O module 132, which may be configured to control the I/O components 112, may receive positioning information indicative of a position of a print head of the I/O components 112 relative to a reference location from a position module 134. The position module 134 may control one or more navigation sensors 138 to capture navigational measurements to track incremental movement of the IT device 104 relative to the reference location.

In some embodiments, the navigational measurements may be navigational images of a medium adjacent to the IT device 104. In these embodiments, the navigation sensors 138 may include one or more imaging navigation sensors. An imaging navigation sensor may include a light source, e.g., light-emitting diode (LED), a laser, etc., and an optoelectronic sensor designed to capture a series of navigational images of an adjacent medium as the IT device 104 is moved over the medium. In accordance with various embodiments of the present invention, the navigation sensors 138 comprise infrared complimentary metal oxide semiconductor (IR CMOS) sensors, also known in the art as IR Cameras.

The position module 134 may process the navigational images to detect structural variations of the medium. The movement of the structural variations in successive images may indicate motion of the IT device 104 relative to the medium. Tracking this relative movement may facilitate determination of the precise positioning of the navigation sensors 138. The navigation sensors 138 may be maintained in a structurally rigid relationship with the I/O components 112, thereby allowing for the calculation of the precise location of the I/O components 112.

The navigation sensors 138 may have operating characteristics sufficient to track movement of the image translation device 104 with the desired degree of precision. In one example, imaging navigation sensors may process approximately 2000 frames per second, with each frame including a rectangular array of 30×30 pixels. Each pixel may detect a six-bit grayscale value, e.g., capable of sensing 64 different levels of patterning.

Once the I/O module 132 receives the positioning information it may coordinate the location of the print head to a portion of the processed image with a corresponding location. The I/O module may then control the print head of the I/O components 112 in a manner to deposit a printing substance on the medium adjacent to the IT device 104 to represent the corresponding portion of the processed image.

The print head may be an inkjet print head having a plurality of nozzles designed to emit liquid ink droplets. The ink, which may be contained in reservoirs or cartridges, may be black and/or any of a number of various colors. A common, full-color inkjet print head may have nozzles for cyan, magenta, yellow, and black ink. Other embodiments may utilize other printing techniques, e.g., toner-based printers such as laser or LED printers, solid ink printers, dye-sublimation printers, inkless printers, etc.

In an embodiment in which an IT operation includes a scanning operation, the I/O module 132 may function as an image capture module and may be communicatively coupled to one or more optical imaging sensors of the I/O components 112. Optical imaging sensors, which may include a number of individual sensor elements, may be designed to capture a plurality of surface images of a medium adjacent to the IT device 104. The surface images may be individually referred to as component surface images. The I/O module 132 may generate a composite image by stitching together the component surface images. The I/O module 132 may receive positioning information from the position module 134 to facilitate the arrangement of the component surface images into the composite image.

Relative to the imaging navigation sensors, the optical imaging sensors may have a higher resolution, smaller pixel size, and/or higher light requirements. While the imaging navigation sensors are configured to capture details about the structure of the underlying medium, the optical imaging sensors may be configured to capture an image of the surface of the medium itself.

In an embodiment in which the IT device 104 is capable of scanning full color images, the optical imaging sensors may have sensor elements designed to scan different colors.

A composite image acquired by the IT device 104 may be subsequently transmitted to the image transfer device 120 by, e.g., e-mail, fax, file transfer protocols, etc. The composite image may be additionally/alternatively stored locally by the IT device 104 for subsequent review, transmittal, printing, etc.

In addition (or as an alternative) to composite image acquisition, an image capture module may be utilized for calibrating the position module 134. In various embodiments, the component surface images (whether individually, some group, or collectively as the composite image) may be compared to the processed print image rendered by the image processing module 128 to correct for accumulated positioning errors and/or to reorient the position module 134 in the event the position module 134 loses track of its reference point. This may occur, for example, if the IT device 104 is removed from the medium during an IT operation.

The IT device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image transfer device 120, a power cord coupled to an alternating current (AC) outlet, etc.).

Figure 2:
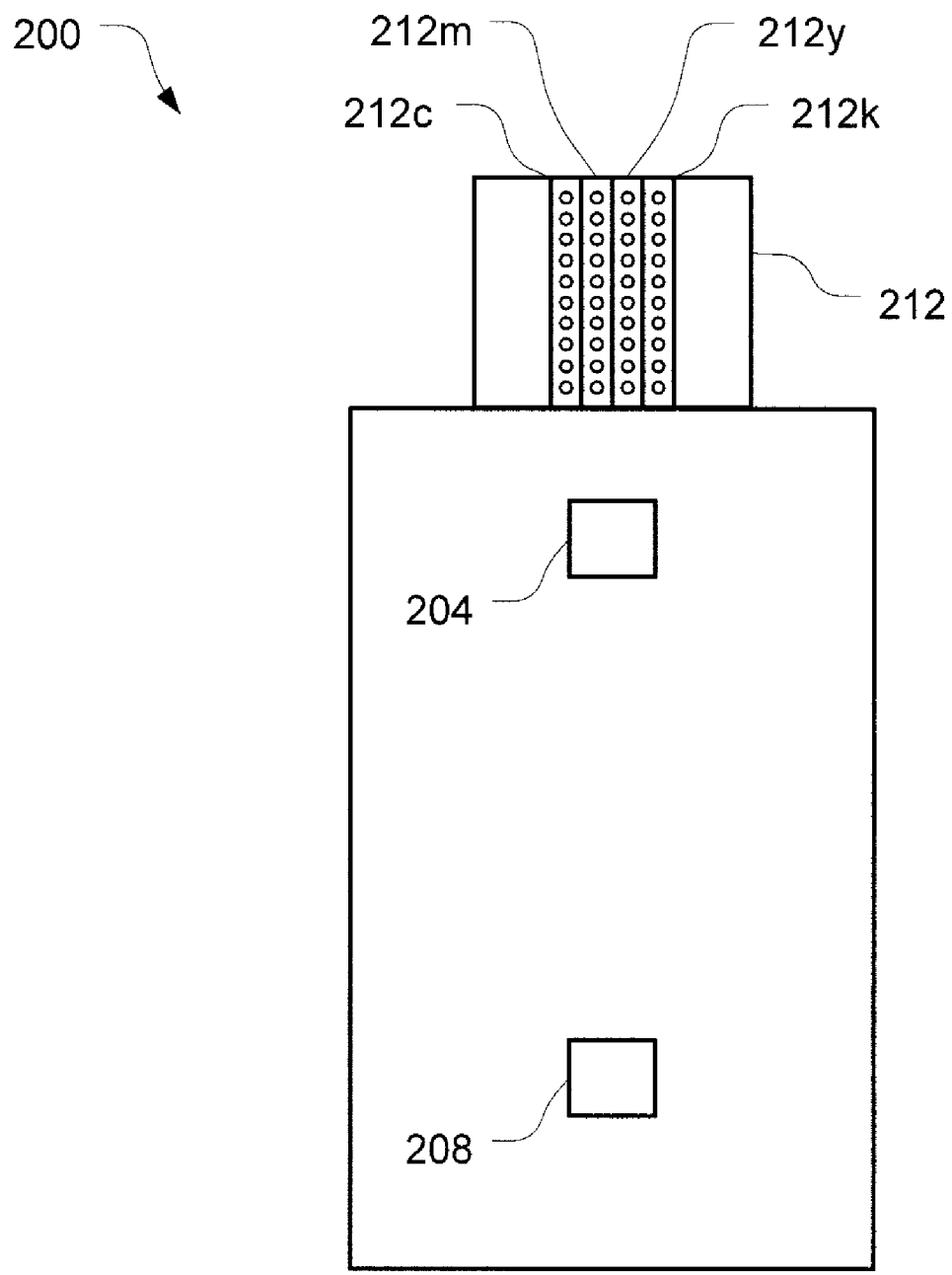
FIG. 2 is a bottom plan view of a handheld image translation device in accordance with various embodiments of the present invention.

FIG. 2 is a bottom plan view of an IT device 200 in accordance with various embodiments of the present invention. The IT device 200, which may be substantially interchangeable with IT device 104, may have a first navigation sensor 204, a second navigation sensor 208, and a print head 212. Those skilled in the art will understand that more or fewer navigation sensors may be included as desired depending upon the application.

The navigation sensors 204 and 208 may be used by a position module, e.g., position module 134, to determine positioning information related to the print head 212. As stated above, the proximal relationship of the print head 212 to the navigation sensors 204 and 208 may be fixed to facilitate the positioning of the print head 212 through information obtained by the navigation sensors 204 and 208.

The print head 212 may be an inkjet print head having a number of nozzle rows for different colored inks. In particular, and as shown in FIG. 2, the print head 212 may have a nozzle row 212c for cyan-colored ink, a nozzle row 212m for magenta-colored ink, a nozzle row 212y for yellow-colored ink, and nozzle row 212k for black-colored ink.

While the nozzle rows 212c, 212m, 212y, and 212k shown in FIG. 2 are arranged in rows according to their color, other embodiments may intermix the different colored nozzles in a manner that may increase the chances that an adequate amount of appropriate colored ink is deposited on the medium through the natural course of movement of the IT device 200 over the medium.

In another embodiment, the IT device 200 may include optical imaging sensors adjacent to the nozzle rows.

Figure 3:
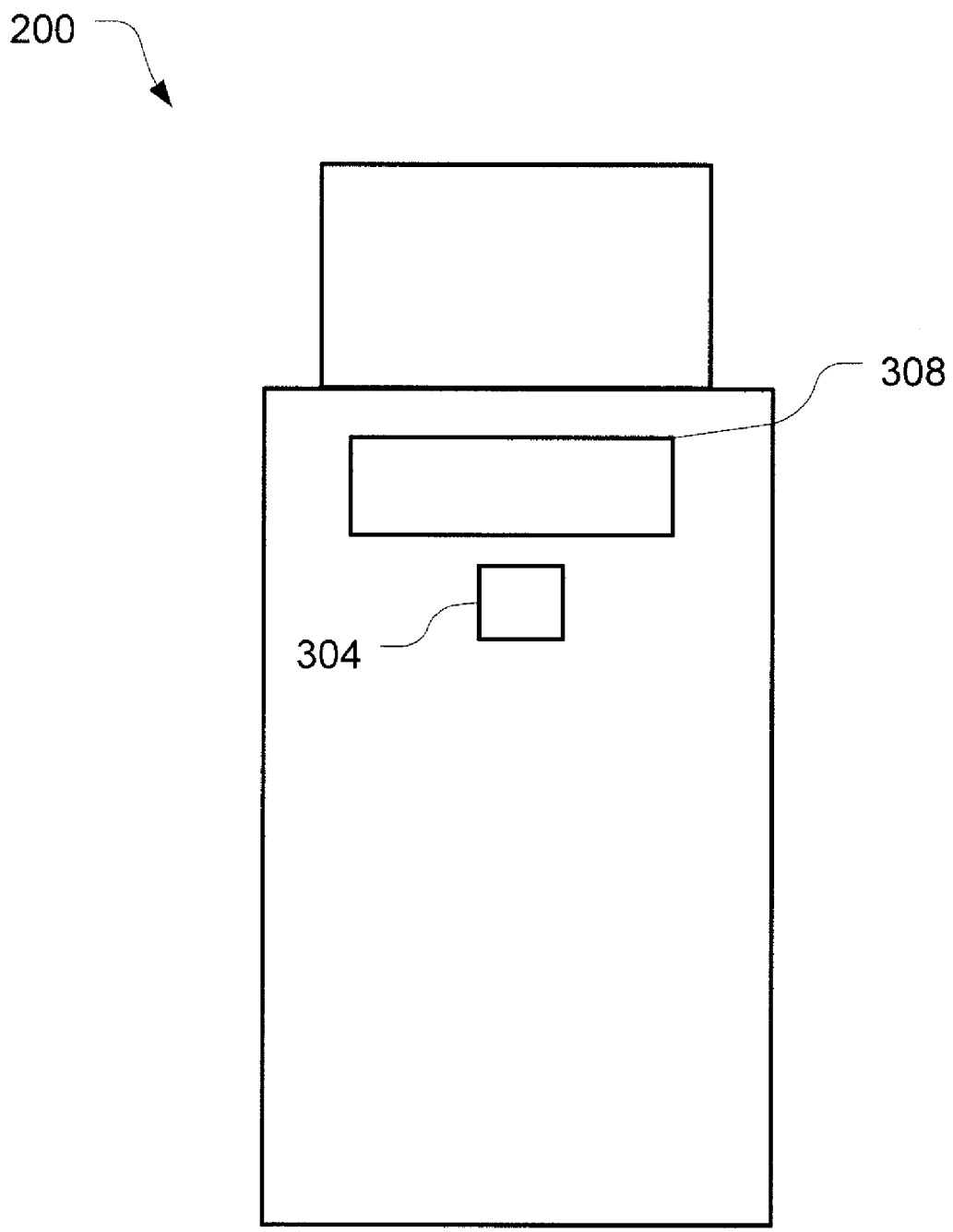
FIG. 3 is a top plan view of a handheld image translation device in accordance with various embodiments of the present invention.

FIG. 3 is a top plan view of the IT device 200 in accordance with various embodiments of the present invention. The IT device 200 may have a variety of user input/outputs to provide the functionality enabled through use of the IT device 200. Some examples of input/outputs that may be used to provide some of the basic functions of the IT device 200 include, but are not limited to, an IT control input 304 to initiate/resume a print and/or scan operation and a display 308.

The display 308, which may be a passive display, an interactive display, etc., may provide the user with a variety of information. The information may relate to the current operating status of the IT device 200 (e.g., printing, scanning, ready to print, ready to scan, receiving image data, transmitting image data, etc.), power of the battery, errors (e.g., positioning/printing/scanning error, etc.), instructions (e.g., "place IT device on medium prior to initiating IT operation," etc.). If the display 308 is an interactive display it may provide a control interface in addition to, or as an alternative from, the IT control input 304.

Figure 4:
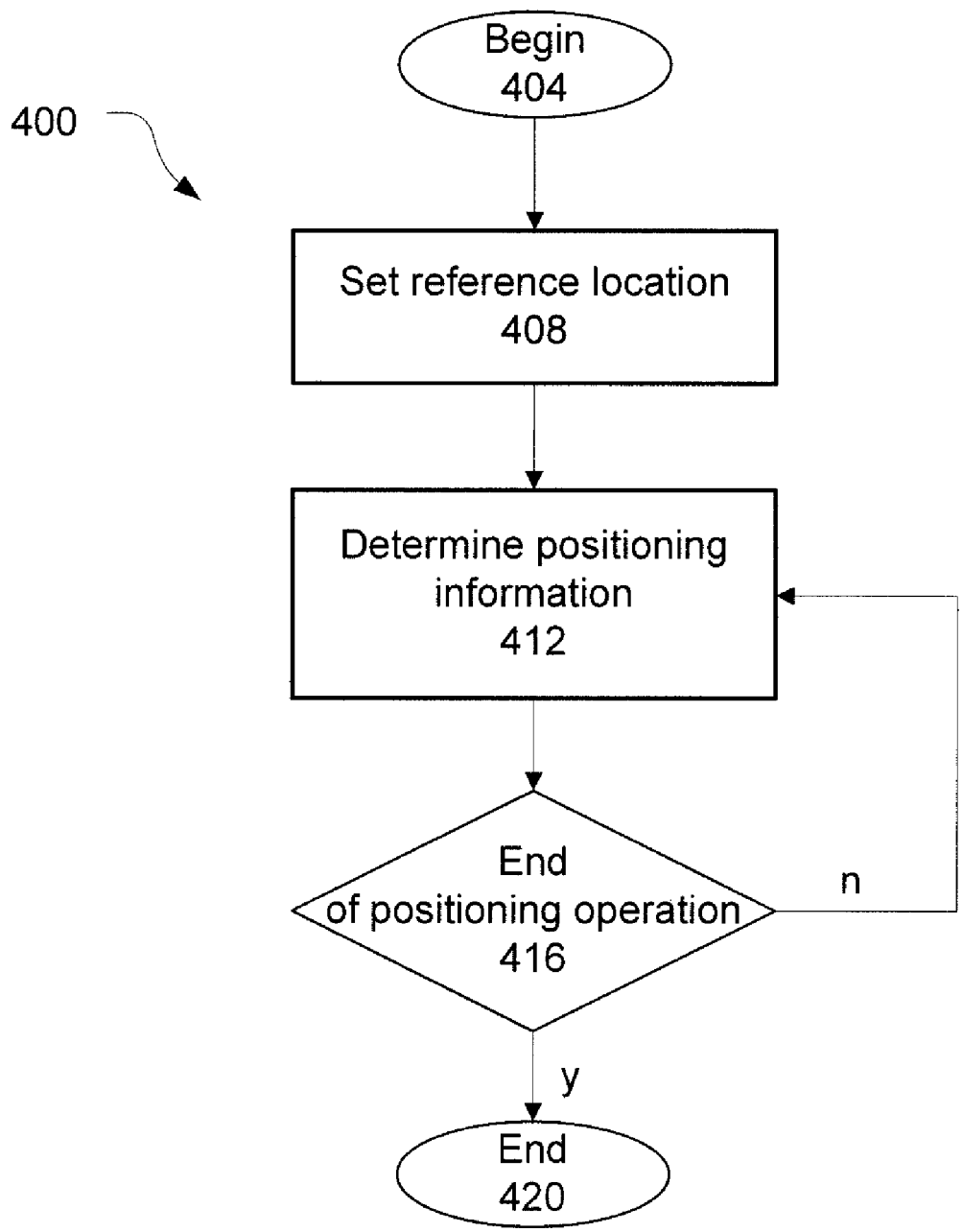
FIG. 4 is a flow diagram depicting a positioning operation of a handheld image translation device in accordance with various embodiments of the present invention.

FIG. 4 is a flow diagram 400 depicting a positioning operation of the IT device 200 in accordance with various embodiments of the present invention. A positioning operation may begin at block 404 with an initiation of a printing operation, e.g., by activation of the IT control input 304. A position module within the IT device 200 may set a reference location at block 408. The reference location may be set when the IT device 200 is placed onto a medium at the beginning of an IT operation. This may be ensured by the user being instructed to activate the IT control input 304 once the IT device 200 is in place and/or by the proper placement of the IT device 200 being treated as a condition precedent to instituting the positioning operation. In some embodiments the proper placement of the IT device 200 may be automatically determined through the navigation sensors 204 and/or 208 and/or some other sensors (e.g., a proximity sensor).

Once the reference location is set at block 408, the position module may determine positioning information, e.g., translational and rotational changes from the reference location, using the navigation sensors 204 and 208, and transmit the determined positioning information to an I/O module at block 412. The translational changes may be determined by tracking incremental changes of the positions of a navigation sensor along a two-dimensional coordinate system, e.g., $\Delta x$ and $\Delta y$. Rotational changes may refer to changes in the angle of the IT device 200, e.g., $\Delta \Theta$), with respect to, e.g., the y-axis. These transitional and/or rotational changes may be determined by the position module comparing consecutive navigational measurements taken by the navigation sensors 204 and 208 to detect these movements. This process may be further explained by reference to FIG. 5 and corresponding discussion.

While embodiments of the present invention discuss tracking an IT device in a two-dimensional coordinate system, other embodiments may include tracking within a three-dimensional coordinate system.

Figure 5:
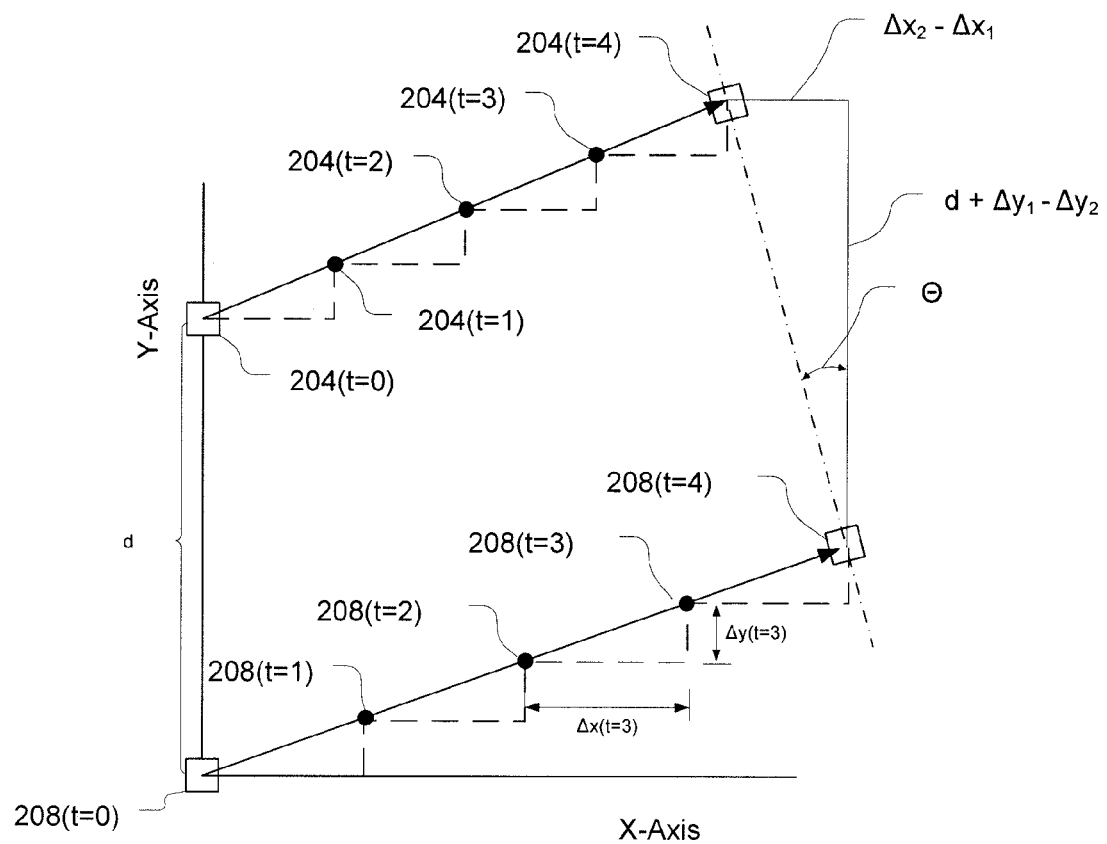
FIG. 5 is a graphic depiction of a positioning operation of a handheld image translation device in accordance with various embodiments of the present invention.

FIG. 5 is a graphic depiction of a positioning operation of the IT device 200 in accordance with embodiments of the present invention. At initiation, e.g., t=0, the sensors 204 and 208 may be in an initial position indicated by 204(t=0) and 208(t=0), respectively. Over successive time intervals, e.g., t=1-4, the sensors 204 and 208 may be moved to an end position indicated by 204(t=4) and 208(t=4), respectively. As used in description of this embodiment, the "initial position" and the "end position" are used merely with reference to this particular operation and not necessarily the start or end of the printing operation or even other positioning operations.

As the sensors 204 and 208 are moved, they may capture navigational measurements at each of the indicated time intervals, e.g., t=0-4. The capture period may be synchronized between the sensors 204 and 208 by, e.g., hardwiring together the capture signals transmitted from the position module. The capture periods may vary and may be determined based on set time periods, detected motion, or some other trigger. In some embodiments, each of the sensors 204 and 208 may have different capture periods that may or may not be based on different triggers.

The captured navigational measurements may be used by the position module to determine a translation of the IT device 200 relative to a reference location, e.g., the sensors 204(t=0) and 208(t=0) as well as a rotation of the IT device 200. In some embodiments, the translation of the device 200 may be determined by analyzing navigational measurements from a first sensor, e.g., sensor 204, while the rotation of the device 200 may be determined by analyzing navigational measurements from a second sensor, e.g., sensor 208. In particular, and in accordance with some embodiments, the rotation of the IT device 200 may be determined by comparing translation information derived from the navigational measurements provided by sensor 208 to translation information derived from navigational measurements provided by sensor 204. Determining both the translation and the rotation of the IT device 200 may allow the accurate positioning of all of the nozzles of the print head 212.

The translation of the sensors 204 and 208 may be determined within the context of a world-space (w-s) coordinate system, e.g., a Cartesian coordinate system. In particular, the translation values may be determined for two-dimensions of the w-s coordinate system, e.g., the x-axis and the y-axis as shown in FIG. 5. For example, the position module may accumulate the incremental Δx's and Δy's between successive time periods in order to determine the total translation of the sensors 204 and 208 from time zero to time four. The accumulated changes for sensor 204 may be referred to as $\Delta x_1$ and $\Delta y_1$ and the accumulated changes for sensor 208 may be referred to as $\Delta x_2$ and $\Delta y_2$. The sensors 204 and 208 may be a distance d from one another. The rotation Θ of the IT device 200 may then be determined by the following equation:

$$\theta = \sin^{-1}\left(\frac{|\Delta x_2 - \Delta x_1|}{d}\right),. \qquad \text{Eq. 1}$$

In some embodiments, each of the sensors 204 and 208 may report incremental delta values within their respective coordinate systems, which may then be mapped to the w-s coordinate system to provide the w-s translation and/or rotation values. As may be seen from Eq. 1, the rotation Θ is derived in part by providing the distance d in the denominator of the arcsin value. Accordingly, a large distance d may provide a more accurate determination of the rotation Θ for a given sensor resolution. Therefore, in designing the IT device 200, the distance d may be established based at least in part on the resolution of the data output from the sensors 204 and 208. For example, if the sensors 204 and 208 have a resolution of approximately 1600 counts per inch, the distance d may be approximately two inches. In an embodiment having this sensor resolution and distance d, the rotation Θ may be reliably calculated down to approximately 0.0179 degrees.

While the embodiment shown in FIG. 2 illustrates the sensors 204 and 208 located on a first side of the print head 212, other configurations may be employed while still maintaining the desired distance d. For example, the sensors 204 and 208 may be on opposite sides of the print head 212. The configuration employed may be selected based on objectives of a particular embodiment. For example, disposing both sensors 204 and 208 on the same side of the print head 212 may limit the potential for ink contamination on the sensors 204 and 208 when printing and may allow more time for ink to dry on the medium before a second print pass is made in the same area, where the wet medium may induce more drag when the unit passes through the partially printed zone. In another example, placing the sensors 204 and 208 on opposite sides of the print head 212 may facilitate a detection of an edge of the medium.

Referring again to FIG. 4, following position determination at block 412, the position module may determine whether the positioning operation is complete at block 416. If it is determined that the positioning operation is not yet complete, the operation may loop back to block 412. If it is determined that it is the end of the positioning operation, the operation may end in block 420. The end of the positioning operation may be tied to the end of a printing operation, which is further described herein with reference to FIG. 11.

In accordance with various embodiments of the present invention, pre-marked (pre-tagged) paper using a marking technology that is not visible to the human eye such as, for example, yellow or infrared on a paper medium is used as a print medium. This pre-tagged medium has markings or tags encoded on its surface that provide absolute X, Y position information relative to the actual position that the data was encoded on the medium. To decode or determine the position data, navigation sensors 204 and 208 are CMOS sensors that are able to read the encoded information on the pre-tagged medium in order to extract the absolute X, Y position data.

Thus, this embodiment of the present invention uses CMOS imaging sensors tuned to the light wave of the encoded marking on the medium that may read the absolute encoded X, Y position information on the medium while the IT device 200 is in motion. This embodiment allows the IT device 200 to extract absolute position information for each position measurement. With this type of approach, the position errors are generally not cumulative. As with the embodiments that use optical navigation technology, this embodiment again includes a configuration using two sensors 204 and 208 that each provides the absolute X, Y position data that is then used to calculate the angular accuracy for the print head position that is desired in order to support printing. Additionally, velocity of the IT device 200 may also be determined by calculating the changes in position and the time involved with the changes in position.

Figure 6:
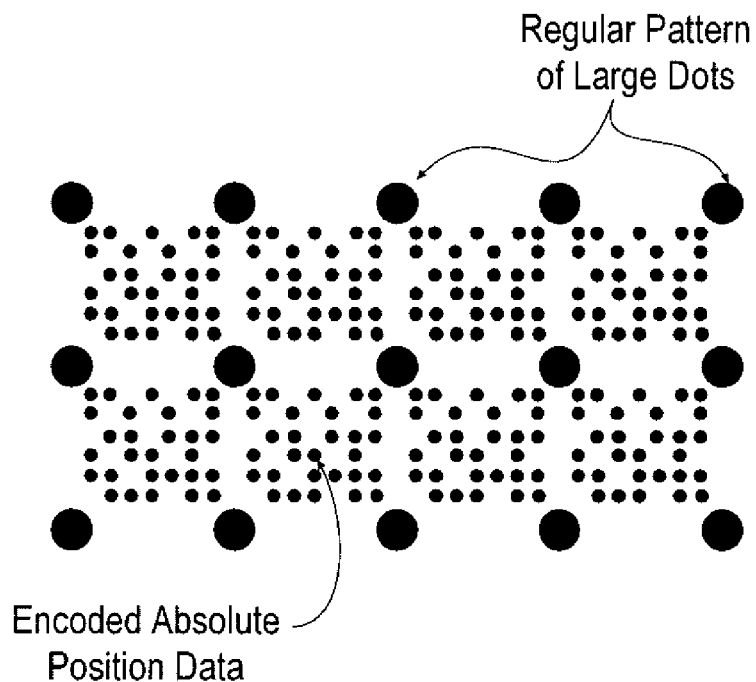
FIG. 6 schematically illustrates an example of an IR tag pattern in accordance with various embodiments of the present invention.

Thus, in this type of embodiment, the print medium needs to be pre-printed with the tag information. In accordance with various embodiments, the marking information is infrared encoding and thus, the navigation sensors 204 and 208 are IR CMOS imaging sensors that may capture the IR signature that is only readable under IR illumination (and therefore not visible to the human eye). The IR signature or tag information may consist of a regular pattern and a field of digitally encoded data. The regular pattern may be used to determine small scale position offsets and rotation. The data may provide the absolute position on the medium. An example of IR CMOS sensors and pre-tagged paper technology is provided by Silverbrook research in Sydney, Australia. FIG. 6 illustrates an example of an IR tag pattern. The pre-printed tags are processed to yield an overall position and angle of each sensor 204 and 208. The position information of the two sensors 204 and 208 is used to create a composite position and rotation of the IT device 200 printing system. It should be understood that the tags in FIG. 6 are magnified. In actual use, the tags would be printed with ink that absorbs in the IR spectrum and not in the visible spectrum making the markings invisible to the naked eye.

Since the position information delivered by the sensors 204 and 208 are absolute with respect to the print medium, very little processing is necessary to determine the final position information. In accordance with various embodiments, the position data from the sensors 204 and 208 are scaled to a local form of 16.16 integer data. The 16 bit super radix data is the position in 300th's of an inch to correspond to the resolution of the print system. The two positions are averaged to incorporate the data from both sensors 204 and 208 in the final position. Averaging reduces the position noise. The datum of the resultant position is the midpoint between the centers of the two sensors 204 and 208. In accordance with various embodiments of the present invention, since the printing system of the IT device 200 desires new position data every millisecond or even faster, intermediate positions are predicted. A simple first order predictive interpolation may achieve reasonable results. The last two measured positions may be used to compute an X and Y derivative. Interpolated points may be computed by the following equations:

$$Xi = Xs + dx/dt * \Delta T \qquad \text{Eq. 2}$$

$$Yi = Ys + dy/dt * \Delta T \qquad \text{Eq. 3}$$

In order to deal with changes in velocity and acceleration, a two dimensional parametric curve function may be employed. The two dimensional parametric curve describes the motion of the IT device 200 as a parametric equation with time (t) as the parametric value.

$$X = A_x t^3 + B_x t^2 + C_x t + D_x$$

$$Y = A_y t^3 + B_y t^2 + C_y t + D_y \qquad \text{Eqs. 5 and 6}$$

Equations 5 and 6 represent the form of a BiCubic Spline, a two dimensional parametric curve. In equations 5 and 6, the coefficients correspond to the starting position (D), velocity (C), acceleration (B), and the rate change of the acceleration (A) in the X and Y axes. There are numerous methods known in the art for determining the coefficients for these equations. One well know method, the Catmull Rom Bicubic Spline, offers the advantage of ensuring that the resulting equations will contain the input control points.

Figure 7:
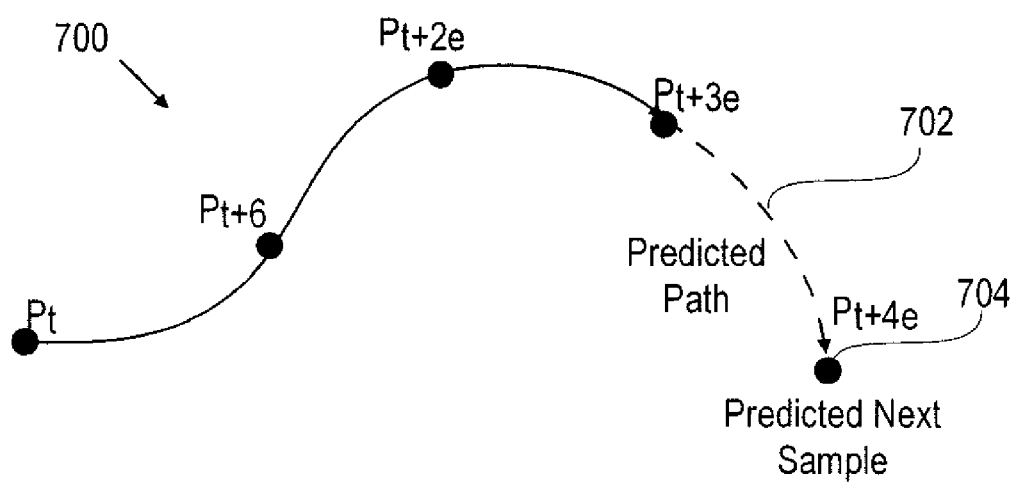
FIG. 7 schematically illustrates an example of a position path.

Referring to FIG. 7, with a 3rd degree equation, four points are generally required to establish all four coefficients for the two equations. The X and Y axes may be treated separately. The sample points may be taken at equal intervals of time. This helps insure that the arc length of the curve is interpreted correctly. If the points on the curve are at widely varying intervals, then the time domain has to be separately smoothed to yield correct prediction results.

Although the Catmull Rom Bicubic Spline coefficients help ensure that the sampled history will be included in the curve 700 defined by the equations, the Predicted Path portion 702 of the curve will not necessarily exactly match the actual path. In order to evaluate the performance of this embodiment, a Predicted Next sample 704 at t+4e may be compared to a next actual position measured by at least one of the sensors 204 and 208.

To compute an angle of the IT device 200, the difference in the X and Y positions may be first determined. The X difference is divided by the Y difference. To accomplish this, the values of X and Y may be adjusted to best take advantage of limited 32 bit integer arithmetic that may be native to the position module 134.

Figure 8:
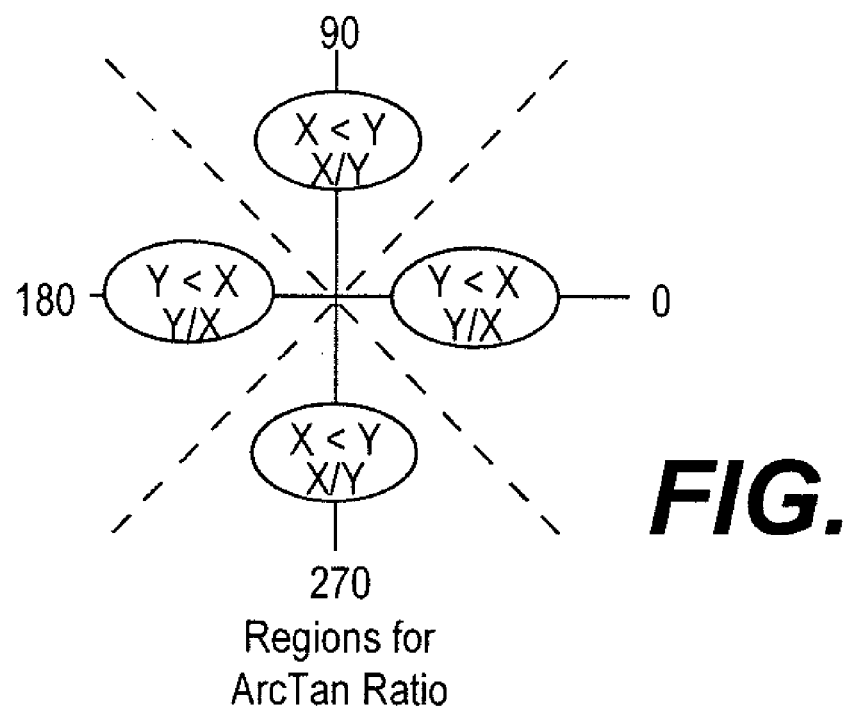
FIG. 8 schematically illustrates regions for ArcTan ratio.

In accordance with various embodiments, the ratio, X/Y, may be used to determine the Arc Tangent, for example by looking it up in a table. The result of the table lookup is the angle of the IT device 200 with respect to the pre-printed grid of encoded Tag information on the print medium. The table may be represented by a range of 0 to 45 degrees in a table that is 16K(K=1024) locations long. The ratio may also be represented as Y/X, when the X value is larger than the Y value. This limits the range of the ratio to numbers that are less than one and avoids the singularity of dividing by zero as the angle approaches 90 degrees and 270 degrees. FIG. 8 illustrates regions for the Arc Tangent ratio.

Using the position and angle information, the position of the IT device 200, and thereby the print head 212, may be determined by the same two dimensional space rotation that was previously described with reference to FIG. 5 based on a traditional optical navigation based system.

The result is that the position of the printing of IT device 200 is fixed to the print medium. To move the starting position of the image on the page, a starting position is captured just before printing starts, as previously described with reference to FIG. 4. This initial position is subtracted from the absolute position, allowing the image to be placed anywhere on the print medium. In order to print at odd angles, the initial angle of the IT device 200 may be captured. When the print offset angle is not zero, the position information should be rotated to affect a rotation of the image on the print medium.

Before the position information is conveyed to the print system, the positions are rotated about the initial or start position of the image. The result is a position and angle relative print.

$$X_r = X^* \cos\theta - Y^* \sin\theta \qquad \text{Eq. 7}$$

$$Y_r = X^* \sin\theta + Y^* \cos\theta \qquad \text{Eq. 8}$$

For convenience, the angle may be snapped to the 0, 90, 180 and 270 offsets. To do this, the angle may be forced to one of the 4 snap angles. The "snap" occurs when the angle is within a small range close to the 90 degree snap angles.

After the position and angle of the IT device 200 is computed by the position module 134, the information is passed to the print head 212, which may compute the position of every nozzle with respect to the image and fires the relevant nozzles.

Figure 9:
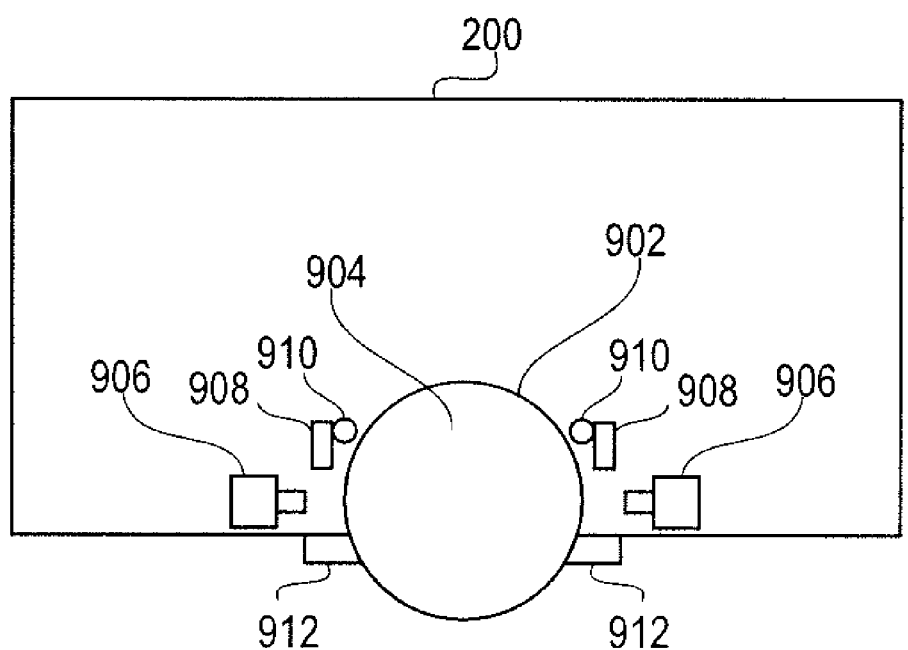
FIG. 9 schematically illustrates an input arrangement for a handheld device for determining position, angle and/or velocity of the handheld device in accordance with various embodiments of the present invention.
Figure 10:
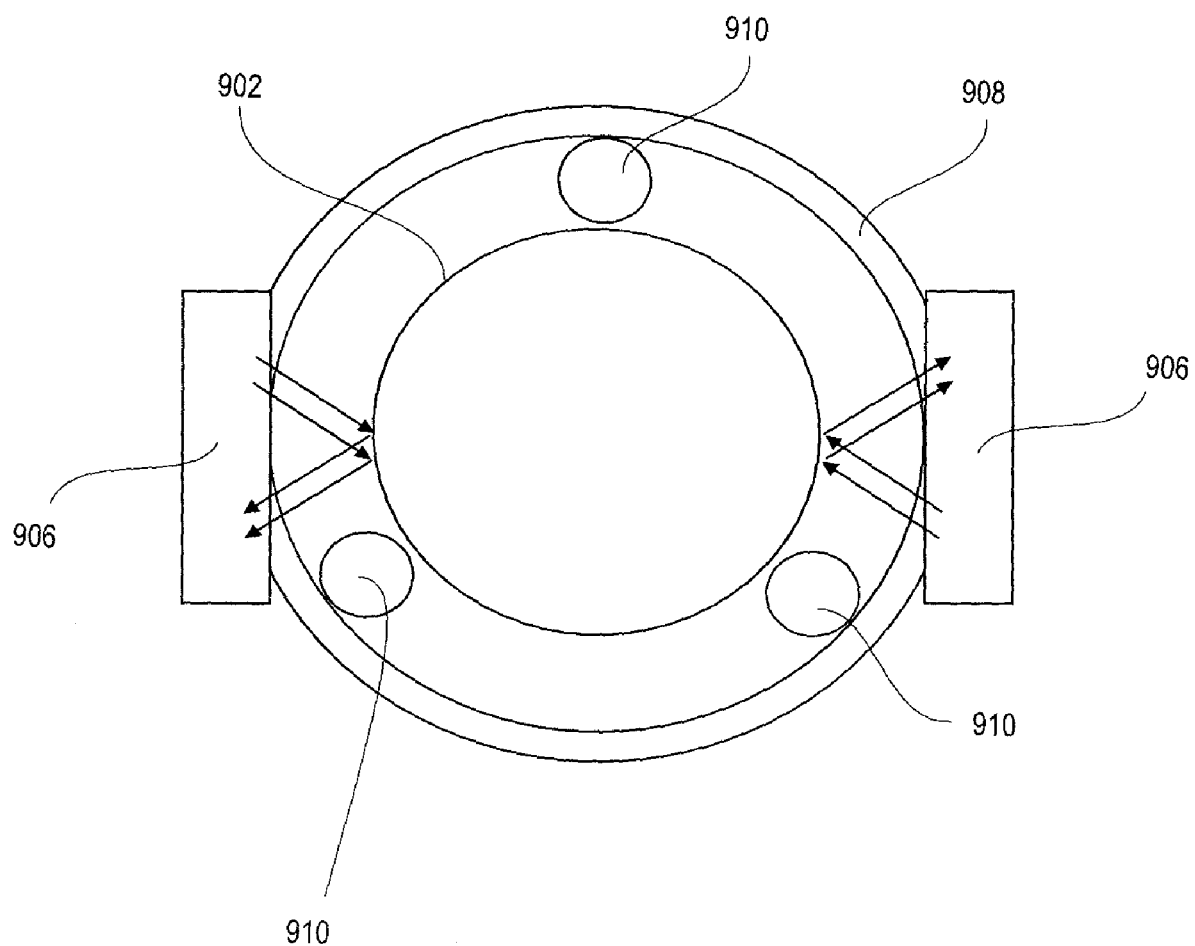
FIG. 10 schematically illustrates a top view of the input arrangement illustrated in FIG. 9 in accordance with various embodiments of the present invention.

Referring to FIGS. 9 and 10, in accordance with various embodiments of the present invention, an input apparatus 900 is illustrated. This embodiment is based on a traditional mechanical mouse approach and includes a roller ball 902 that includes encoded information markings 904 on its surface that is read by a CMOS imaging sensor 906 that includes both a light source and a sensor as is known in the art. The markings 904 include absolute position information that is read by the CMOS imaging sensor 906, which provides absolute position information relating to longitudinal and latitudinal position of roller ball 902. In accordance with various embodiments, two CMOS imaging sensors 906 may be provided to improve accuracy. More CMOS imaging sensors 906 may be provided if desired.

With this embodiment it is not necessary that encoded markings be present on the medium, which is desirable in the embodiment where the medium includes the encoded markings. The roller ball 902 is held in the input apparatus 900 via a mechanical "sandwich" that allows free rotation and couples linear motion to the system. In accordance with various embodiments, this arrangement includes a frame 908 to help stabilize and hold the roller ball 902 in place within the IT device 200. Three bearings 910 are provided to cooperate with the frame 908 to provide movable support. Such an arrangement allows the roller ball to be free to move within the frame 908 with a level of friction provided in order to provide both user tactical feedback and to prevent the roller ball 902 from have random movement when the IT device 200 is lifted from the print medium.

In accordance with various embodiments, a cleaning bracket 912 that provides a cleaning material that constantly sweeps the roller ball 902 free of contaminants that may negatively impact navigation results may be provided adjacent to the roller ball 902. The cleaning bracket 912 may be a single device that surrounds a portion of the roller ball 902 or may consist of multiple devices.

As in previous embodiments, two input arrangements 900 are included (as opposed to two navigation sensors 204 and 208) to calculate the angle information associated with a given X, Y position. In accordance with various embodiments, four input arrangements 900 are used to act as contact points to the media surface and to improve positioning accuracy. This provides a way to keep the printing operation planar to the surface where navigation and printing is taking place. As discussed, only two of the input arrangements 900 need have the CMOS imaging sensors 906 included to detect surface movement and report on actual roller ball position X,Y data, if desired. Mathematical determination of the X,Y position, angle and/or velocity of the IT device 200 is then determined by reading the markings on the roller balls 902 of the input arrangements 900 with CMOS imaging sensors 906 and is similar to what has been previously described with reference to reading the pre-tagged medium that has been encoded with position information with reference to FIGS. 6-8.

In accordance with various embodiments, the roller ball 902 surface markings may be matched with characteristics for a given CMOS imaging sensor 906, both the light source and image sensor. Such optimization may take the form of recognizable patterns either painted on or embedded within the roller ball 902 itself. The optimization may also entail a tuned light source and image sensor, which may be more delicate than the encoding technology in current devices given that the delicate navigation sensor elements are protected by the IT device 200 housing.

Those skilled in the art will understand that the IT device 200 may be configured with input arrangements 900 and navigation sensors 204 and 208 such that IT device 200 may determine position, angle and/or velocity of the IT device 200 by one or more of the methods described with reference to FIGS. 6-10, either separately or concurrently if desired.

Figure 11:
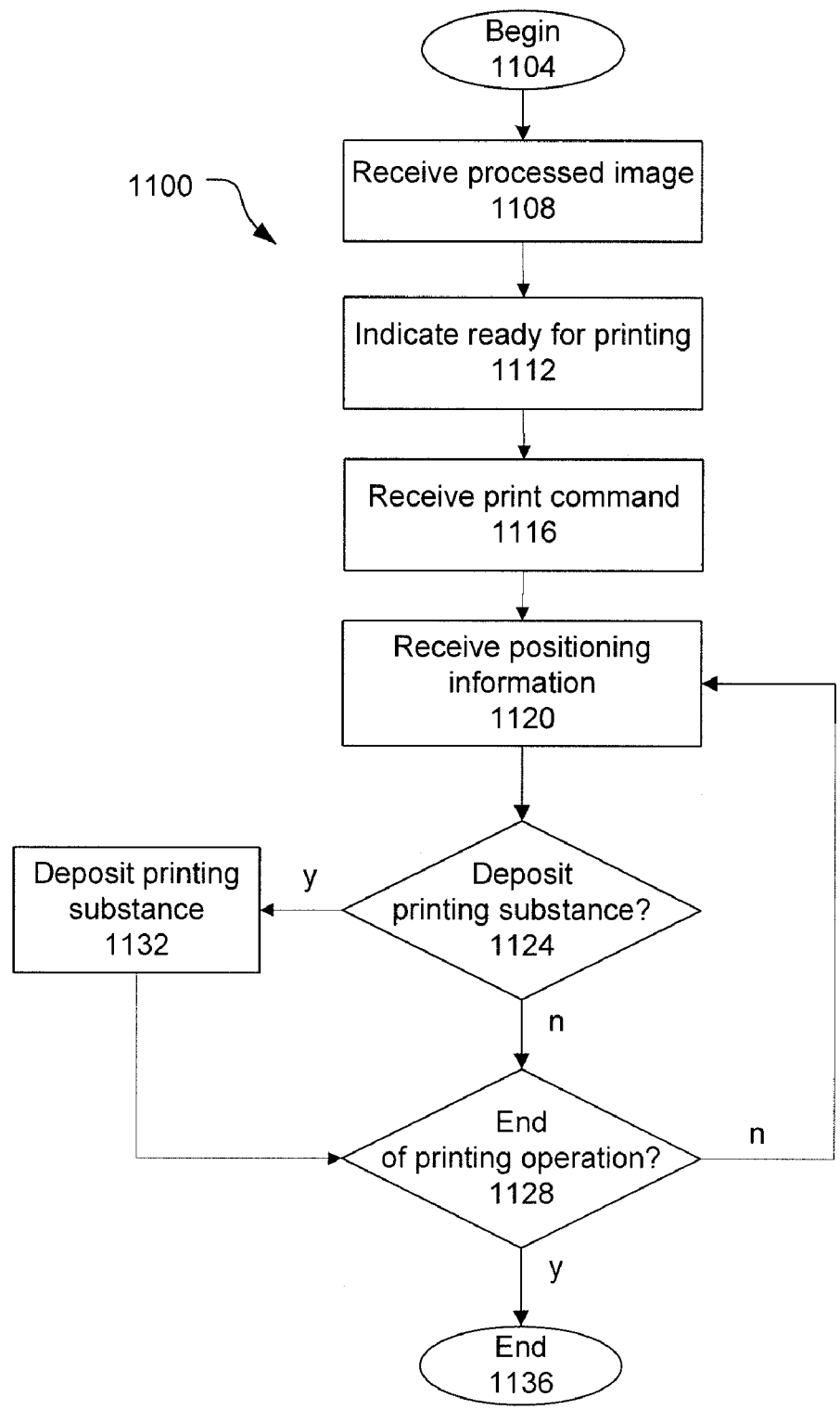
FIG. 11 is a flow diagram depicting a printing operation of a handheld image translation device in accordance with various embodiments of the present invention.

FIG. 11 is a flow diagram 1100 depicting a printing operation of the IT device 200 in accordance with various embodiments of the present invention. The printing operation may begin at block 1104. The print module may receive a processed image from the image processing module at block 1108. Upon receipt of the processed image, the display 308 may indicate that the IT device 200 is ready for printing at block 1112.

The print module may receive a print command generated from a user activating the IT control input 304 at block 1116. The print module may then receive positioning information from the position module at block 1120. The print module may then determine whether to deposit printing substance at the given position at block 1124. The determination as to whether to deposit printing substance may be a function of the total drop volume for a given location and the amount of volume that has been previously deposited.

The print module may make a determination to deposit printing substance by reading a representation of the printed image in memory. If the printing module determines that printing substance is to be deposited, it may modify the image representation to account for the amount and location of deposited printing substance. The print module may use the modified representation to determine if additional deposition of printing substance is required. The print module may use the modified representation to alter the amount of printing substance deposited.

If it is determined that no additional printing substance is to be deposited at block 1124, the operation may advance to block 1128 to determine whether the end of the print operation has been reached. If it is determined that additional printing substance is to be deposited at block 1124, the print module may cause an appropriate amount of printing substance to be deposited at block 1132 by generating and transmitting control signals to the print head that cause the nozzles to drop the printing substance.

As can be seen, the position module's determination of the translation and rotation of the IT device 200 is done prior to the print module controlling the print head to deposit a printing substance. In order for the positioning information to remain relevant to the print determination, it may be desirable that the determination of the positioning information take place as soon as possible after the acquisition of the navigational measurements upon which it is based. Accordingly, the translation and rotation calculations may be done in real time based on data accumulated up to that point. The rotation calculations are not determined retroactively based on a comprehensive accumulation of translation and image data as is done in prior art scanning devices discussed above.

The determination of whether the end of the printing operation has been reached at block 1128 may be a function of the total printed volume versus the total anticipated print volume. In some embodiments the end of the printing operation may be reached even if the total printed volume is less than the total anticipated print volume. For example, an embodiment may consider the end of the printing operation to occur when the total printed volume is ninety-five percent of the total anticipated print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If, at block 1128, it is determined that the printing operation has been completed, the printing operation may conclude at block 1136.

If, at block 1128, it is determined that the printing operation has not been completed, the printing operation may loop back to block 1120.

Figure 12:
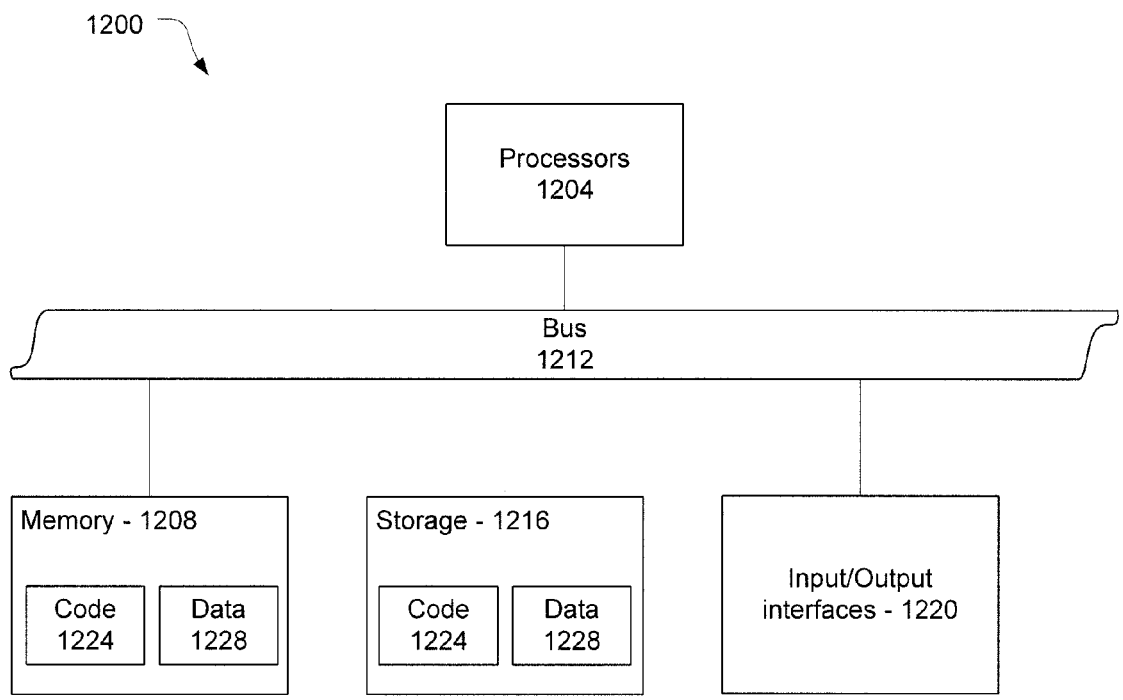
FIG. 12 illustrates a computing device capable of implementing a control block of a handheld image translation device in accordance with various embodiments of the present invention.

FIG. 12 illustrates a computing device 1200 capable of implementing a control block, e.g., control block 108, in accordance with various embodiments. As illustrated, for the embodiments, computing device 1200 includes one or more processors 1204, memory 1208, and bus 1212, coupled to each other as shown. Additionally, computing device 1200 includes storage 1216, and one or more input/output interfaces 1220 coupled to each other, and the earlier described elements as shown. The components of the computing device 1200 may be designed to provide the printing and/or positioning functions of a control block of an IT device as described herein.

Memory 1208 and storage 1216 may include, in particular, temporal and persistent copies of code 1224 and data 1228, respectively. The code 1224 may include instructions that when accessed by the processors 1204 result in the computing device 1200 performing operations as described in conjunction with various modules of the control block in accordance with embodiments of this invention. The processing data 1228 may include data to be acted upon by the instructions of the code 1224. In particular, the accessing of the code 1224 and data 1228 by the processors 1204 may facilitate printing and/or positioning operations as described herein.

The processors 1204 may include one or more single-core processors, multiple-core processors, controllers, application-specific integrated circuits (ASICs), etc.

The memory 1208 may include random access memory (RAM), dynamic RAM (DRAM), static RAM (SRAM), synchronous DRAM (SDRAM), dual-data rate RAM (DDRRAM), etc.

The storage 1216 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1216 may be a storage resource physically part of the computing device 1200 or it may be accessible by, but not necessarily a part of, the computing device 1200. For example, the storage 1216 may be accessed by the computing device 1200 over a network.

The I/O interfaces 1220 may include interfaces designed to communicate with peripheral hardware, e.g., I/O components 112, navigation sensors 138, etc., and/or remote devices, e.g., image transfer device 120.

In various embodiments, computing device 1200 may have more or less elements and/or different architectures.

While embodiments of the present invention have been described with respect to handheld IT devices, those skilled in the art will understand that various aspects of embodiments may be applied to other types of handheld devices.

Although certain embodiments have been illustrated and described herein for purposes of description of preferred embodiments, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
    a frame structure;
    a roller ball rotatably supported within the frame structure, the roller ball having markings encoded on a surface of the roller ball, the markings including absolute position information that relates a position of the roller ball relative to the apparatus; and
    an optical imaging sensor disposed adjacent to the roller ball, the optical imaging sensor configured to read the markings encoded on the surface of the roller ball as the roller ball rotates within the frame structure,
    wherein (i) a position of the apparatus over a medium or (ii) a velocity of movement of the apparatus over the medium is determinable based on the position of the roller ball relative to the apparatus as indicated by the markings read by the optical image sensor as the apparatus moves over the medium.

2. The apparatus of claim 1, further comprising:
    a bearing configured to movably support the roller ball within the frame.

3. The apparatus of claim 1, wherein the optical imaging sensor comprises at least two CMOS imaging sensors.

4. The apparatus of claim 1, further comprising:
    a cleaning bracket positioned adjacent to the roller ball, the cleaning bracket configured to sweep the roller ball clean of contaminants as the rollerball rotates within the frame.

5. The apparatus of claim 1, wherein the roller ball and optical imaging sensor form a first input arrangement disposed on the apparatus, the apparatus further comprising:
    second or more input arrangements disposed on the apparatus, each of the second or more input arrangements comprising:
        an additional frame structure;
        an additional roller ball rotatably supported within the additional frame structure, the additional roller ball having additional markings encoded on a surface of the additional roller ball, the additional markings including absolute position information that relates a position of the additional roller ball relative to the apparatus; and
        an additional optical imaging sensor disposed adjacent to the additional roller ball, the additional optical imaging sensor configured to read the additional markings encoded on the surface of the additional roller ball as the additional roller ball rotates within the frame structure,
    wherein (i) the position of the apparatus over a medium or (ii) the velocity of movement of the apparatus over the medium is determinable further based on the position of the additional roller ball relative to the apparatus as indicated by the additional markings read by the additional optical image sensor as the apparatus moves over the medium.

6. The apparatus of claim 5, wherein the second or more input arrangements comprises at least four input arrangements.

7. The apparatus of claim 1, wherein the markings comprise patterns painted on a surface of the roller ball.

8. The apparatus of claim 1, wherein the markings comprise patterns embedded in a surface of the roller ball.

9. The apparatus of claim 1, wherein the apparatus is a handheld device.

10. The apparatus of claim 1, wherein the apparatus is a printer or a scanner.

11. The apparatus of claim 1, wherein the apparatus is an image translation device to print and to scan.

12. A method comprising:
    moving a handheld device over a surface;
    reading markings on at least one of the surface and/or an input apparatus of the handheld device, wherein the markings include absolute position information;
    determining at least one of a position and/or an angle and/or a velocity of the handheld device based upon the reading of the markings; and
    determining a predictive position of the handheld device, wherein the predictive position is determined using a two dimensional parametric curve function, and
    wherein the two dimensional parametric curve function is a Catmull-Rom Bicubic Spline function.

13. The method of claim 12, further comprising depositing a printing substance on the surface.

14. The method of claim 13 further comprising using an image representation to determine a level of deposition of the printing substance.

15. The method of claim 14 further comprising using an image representation that is modified as the printing substance is deposited.

16. The method of claim 12, further comprising scanning information from the surface.

17. The method of claim 16 further comprising stitching the scanned information to form a complete scanned image.

18. The method of claim 12, wherein the markings are read from a track ball included in the input apparatus.

19. The method of claim 18, further comprising cleaning the track ball as the handheld device is moved.

20. The method of claim 12, wherein the markings are read from the surface.

21. The method of claim 12, wherein the markings are read from the surface and from a track ball included in the input apparatus.

* * * * *